Figure 1:
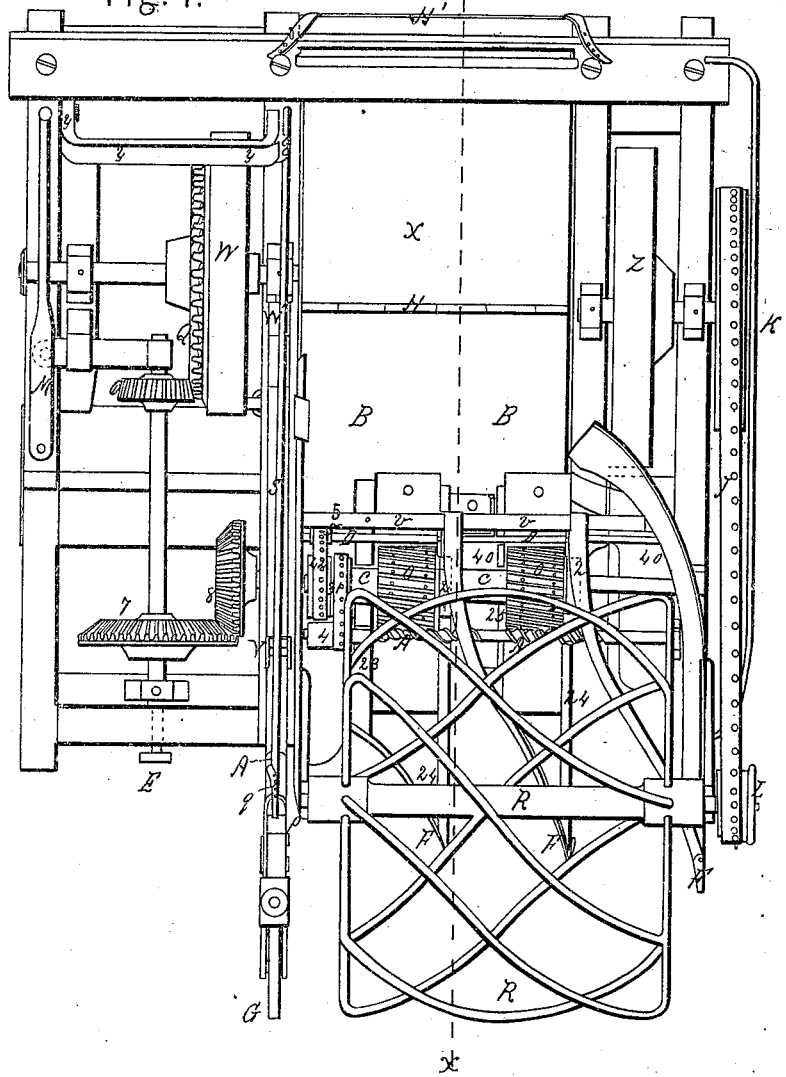

Sheet 1-2 Sheets.

M. Vanderpool.
Harvester & Thresher.

No. 82896. Patented Oct. 6, 1868.

Witnesses.
Geo. W. Rockwell
A. M. Tanner

Inventor.
M. Vanderpool
by Munn & Co
Att'ys

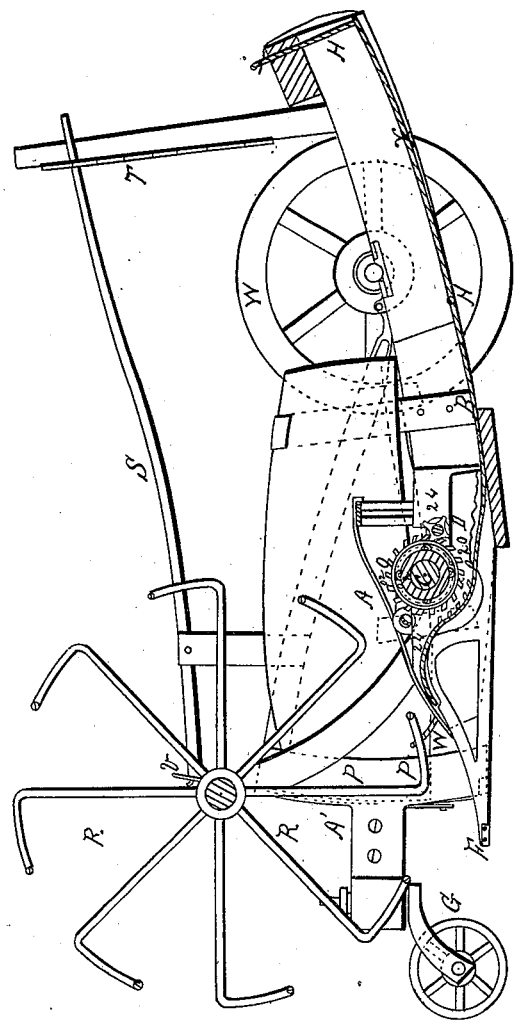

UNITED STATES PATENT OFFICE.

MEDDERS VANDERPOOL, OF POLK COUNTY, OREGON.

IMPROVEMENT IN GRAIN-HARVESTERS.

Specification forming part of Letters Patent No. 82,896, dated October 6, 1868.

*To all whom it may concern:*

Be it known that I, MEDDERS VANDERPOOL, of the county of Polk and State of Oregon, have invented a new and useful Machine for Thrashing Grain without cutting or heading the grain previously. It is intended to pass through the standing grain, (wheat, rye, oats, or barley,) and gather and thrash and save it without cutting the straw; and I do hereby declare that the following is a full, clear, and exact description of the construction and operation of the same, reference being had to the annexed drawings, making a part of this specification, in which—

Figure 1 is a top-plan view, showing my improvements, and Fig. 2 a longitudinal section in the line $x\,x$, Fig. 1.

Similar letters of reference indicate corresponding parts.

This invention relates to an improved machine for harvesting and thrashing grain; and it consists of a skeleton frame-work placed upon two bearing-wheels, W and Z.

The frame is so curved that when the front is raised or adjusted to gather tall grain the rear will not drag upon the ground, the balancing or poising point being the axle of said traction or bearing wheels. Between said wheels is placed a bed or box, X, which receives the grain and chaff as it is thrashed. This box has a joint at H, for the purpose of raising or lowering its rear end when desired. It has also an end gate, H', which can be taken out when necessary to empty it.

At the front of said box X is a cylinder or roller, C C, provided with drums of two sizes. The smaller drums, 2 2, are each armed with a series of studs, $a^1\,a^1$, placed at an equal distance apart. The two larger drums, O O, are surrounded by a series of oblique ribs or rubbers six inches long, between eight and ten inches in diameter, and one-third of an inch apart, and one-half inch deep. Each rubber is bent to the rear. Under each larger drum are similar rubbers $a^2$, adjusted to a concave plate, as shown in Fig. 2. 23 is the right head-piece attached to the concave, and 22 the left head-piece. The latter is grooved upon its upper edge for the passage of the spikes of the drum 2 2. 40 are troughs attached to the left side of the left head-piece and to the right side of the right head-piece. These troughs are channels to the bed X, for the purpose of receiving and conveying the flying grain into said bed.

As the machine moves forward the standing grain is drawn or bent to the right by eight diagonal bars or wings of the reel R R and conducted by the fingers F to the spiral screws A A, thence by said screws to the right head-board of the concave, and thence it is drawn in between the concaves and larger cylinders, where it is thrashed by the rubbers on the cylinders and concaves before described. The straw is forced farther onward to the rear by the spikes on drums 2 2 until it is caught by the studs $a^1\,a^1$ on each wheel of rod D D, which move it still farther to the rear, for the purpose of having all the grain deposited in the box X before the straw, which is not torn from the ground, but is left standing, is drawn out of the machine.

The cylinder C C is operated by a driving cog-wheel, Q Q, through the medium of bevel-pinions 6, 7, and 8, which cause it to revolve at the periphery of its rubbers between four and five times as fast as the periphery of the bearing-wheels W and Z.

The bearing-wheel W is held steady by a small roller near its front on the left side.

The cylinder is raised or lowered by a set-screw at either end of its journal-boxing V. (One-fourth of an inch or less is sufficient.) Said boxings V are so arranged that they can be moved to the front or rear when necessary. The set-screw E is used to regulate the gear of the pinions 7 and 8.

The three endless belts J, 1, and 12 have each a series of holes in it, and the pulleys K, L, 3, 4, and 5 are each armed with a series of short blunt spurs, which prevent the said belts from slipping when slack. These belts operate reel R R, the spiral screws or auger A A, and rod D D, as shown in the drawing.

The front end of the lever S S bears the front end of the whole frame of the machine, which hangs upon a chain or cord, 9, and is raised or lowered at pleasure, (whether the machine is in motion or not,) and can be made fast at any desired height by placing the rear end of said lever in the rack T T.

The frame A', bearing the lever and caster-roller, is prevented from vibrating to the right or left by the front end of the piece N N of the main frame being placed between the perpendicular part of the curved hounds P P P P P, the front end of which rests upon the caster-wheel G. The rear end of the frame A' is hinged to the top side of said frame-piece at W', near the axle of bearing-wheel W.

The lever M M or its equivalent is used to throw the cogs in or out of gear. The horizontal and upright pieces Y Y Y are used or intended for steadying the driver, and also form part of the rack T T.

The frame is coupled together at its rear end, as shown in the drawing, and its front end by the bottom cross-piece B B and the edgewise top cross-piece U U. This last forms the front part of the bottom of the bed X at B B, which part is lined with sheet-iron. On each side of the front part of the bed X is a piece of canvas, or its equivalent, vertically stretched, to conduct the flying grain into said bed.

Each pair of rubbers on said cylinder C C will thrash a one-foot swath, it being one foot between each finger F, the left finger of which is so arranged that it can be turned to the left, so as to take in eighteen inches swath between it and the next right-hand finger.

The power required to propel this machine at full work is one horse to every swath of fifteen inches. Hence it will thrash any reasonable or practicable width, according to the number of the places of rubbers on the cylinder.

I claim—

1. The arrangement of the spiral screw A with the right head-board of the concave 20, whereby the standing grain is conducted to said head-board without being pulled from the ground, as herein shown and described.

2. The combination of the obliquely-ribbed drums O, ribbed concaves 20, and spiked drums 2 2, substantially as described, for the purpose specified.

3. So constructing and arranging the rod D D, provided with tapering spurs, that the standing straw is forced to the rear, to deposit the thrashed grain upon the bed X before said straw is drawn out of the machine, substantially as herein shown and described.

4. The combination of the ribbed drums O O, spurred wheels 2 2, ribbed concaves 20, and troughs 40, substantially as described, for the purpose specified.

MEDDERS VANDERPOOL.

Witnesses:
 J. H. NEYEE,
 J. W. JOHNSON.